United States Patent
Schmid et al.

[11] Patent Number: 5,833,821
[45] Date of Patent: Nov. 10, 1998

[54] ELECTROLYZER

[75] Inventors: Ottmar Schmid, Markdorf; Werner Tillmetz, Lindau, both of Germany

[73] Assignee: Dornier GmbH, Friedrichshafen, Germany

[21] Appl. No.: 759,116

[22] Filed: Dec. 2, 1996

[30] Foreign Application Priority Data

Nov. 30, 1995 [DE] Germany .................. 195 44 585.6

[51] Int. Cl.[6] .............................. C25B 9/00; C25B 9/04
[52] U.S. Cl. .................. 204/255; 204/257; 204/283; 204/279
[58] Field of Search .................. 204/255–258, 204/283, 279

[56] References Cited

U.S. PATENT DOCUMENTS

| | | |
|---|---|---|
| 4,137,136 | 1/1979 | Ueda et al. . |
| 4,331,523 | 5/1982 | Kawasaki . |
| 4,391,682 | 7/1983 | Struck et al. . |
| 4,426,270 | 1/1984 | Schmitt et al. . |
| 4,432,858 | 2/1984 | Schmitt et al. . |
| 4,554,063 | 11/1985 | Braun et al. ........................ 204/254 |
| 4,789,443 | 12/1988 | de Nora et al. ................. 204/255 X |
| 5,256,268 | 10/1993 | Goto et al. ...................... 204/255 X |
| 5,401,371 | 3/1995 | Oshima et al. . |

FOREIGN PATENT DOCUMENTS

| | | |
|---|---|---|
| 0 239 169 | 9/1987 | European Pat. Off. . |
| 0 583 215 | 2/1994 | European Pat. Off. . |
| 23 34 647 | 1/1975 | Germany . |
| 27 47 381 | 4/1978 | Germany . |
| 30 05 032 | 8/1981 | Germany . |
| 31 30 742 | 2/1983 | Germany . |
| 31 30 806 | 3/1983 | Germany . |
| WO 93/24677 | 12/1993 | WIPO . |

*Primary Examiner*—Donald R. Valentine
*Attorney, Agent, or Firm*—Evenson, McKeown, Edwards & Lenahan, P.L.L.C.

[57] ABSTRACT

An electrolyzer has an educt chamber, a membrane, a cathode-side product chamber, a porous cathode, a diaphragm, a porous anode, in which case a liquid electrolyte can be fixed in the pores of the anode and the cathode, and an anode-side product chamber. Between the membrane and the cathode-side product chamber, a first electrically conductive plate and, adjacent to the anode-side product gas chamber, a second electrically conductive plate, are situated. The two conductive plates are used for the current supply to and the current removal from the electrodes.

30 Claims, 6 Drawing Sheets

ELECTROLYZER

BACKGROUND AND SUMMARY OF THE INVENTION

This invention relates to an electrolyzer with a liquid, preferably alkaline electrolyte.

The basic construction of such an electrolyzer, as described in the literature and also applied in the invention, is as follows. It includes two electrodes between which a diaphragm is arranged, an electrolyte solution being fixed in the electrodes by means of capillary forces; a first product chamber adjoining the cathode; a second product chamber adjoining the anode; and a chamber for the educt separated from the first product gas chamber by means of a membrane.

The diaphragm may be porous so that the electrolyte solution can be fixed in the pores of the diaphragm. However, the use of an ion-conducting dense layer is also possible.

The individual elements are arranged between two end flanges and can be pressed to form a cell. In this case, spacers are preferably arranged in the product chambers as well as in the educt chamber. They are used particularly for transmitting the cell pressing and thus for ensuring low transition resistances. However, devices are also known in which the product chambers are machined into the electrodes as recesses (one-sided profiling of the electrode). In this case, no spacers are required for the product chambers.

Several cells are stacked upon one another or next to one another to form a stack, the individual cells being electrically connected in series.

In particular, water or an aqueous solution is used as the educt. Oxygen and hydrogen will then be obtained as product gases.

A person skilled in the art is familiar with the details of carrying out the process, as well as the membranes, educts and electrolyte solutions to be used.

If possible, the current conducting within the cell should be designed such that low voltage drops, and thus low losses of efficiency, are obtained. In principle, a current distribution along the whole cross-sectional surface of the cell or of the electrodes is to be endeavored which is as homogeneous as possible. In the case of an inhomogeneous current density distribution, the maximal current density determines the cell voltage and thus the achievable efficiency. In this case, it should also be taken into account that generally the membrane has a relatively low electric conductivity so that a bipolar current transmission directly by way of the membrane can hardly be implemented.

There is therefore needed an electrolyzer whose interior current conduction is optimized with respect to avoiding undesired voltage drops as well as homogeneity of the current distribution. There is also needed an electrolyzer with a high economic efficiency.

These needs are met according to the present invention by an electrolyzer comprising an educt chamber, a membrane, a cathode-side product chamber, a porous cathode, a diaphragm, an anode-side product chamber, and a porous anode. A liquid electrolyte is fixable in the pores of the anode and the cathode. Between the membrane and the cathode-side product chamber, a first electrically conductive plate and, adjacent to the anode-side product chamber, a second electrically conductive plate, are situated. By way of these two plates, the current supply to and the current removal from the electrodes takes place.

As an individual cell, the electrolyzer according to the invention is constructed as follows. It comprises the following elements (in the sequence of their arrangement): an educt chamber; a membrane 4; a cathode-side product chamber; a porous cathode 8; a diaphragm 10; a porous anode 12, in which case a liquid electrolyte is fixed in the pores of the anode 12 and the cathode 8; and an anode-side product chamber.

According to the invention, the current supply and current discharge from and to the electrodes takes place by way of two electrically conductive plates.

The first of these plates is arranged between the membrane and the cathode-side product chamber. In order to ensure the substance transport within the cell ($H_2O$-supply from the educt chamber to the cathode), the first plate has a perforated construction. This first plate is connected, for example, directly with a pole of a current source. As an alternative, the conductive plate can be electrically connected with current connection elements in one of the end flanges which frame the electrolyzer from two sides. In the simplest case, this may take place by means of electric lines which are arranged outside the cell.

By means of this arrangement, the membrane is bridged which generally has a poor electrical conducting capacity.

The second electrically conductive plate is situated adjacent to the anode-side product chamber on the side facing away from the electrodes. It is connected, for example, with the other pole of the current source or with the current connection elements of the second end flange. No perforation is required for this second plate. The two conductive plates preferably extend along the whole cross-section of the cell.

In a preferred embodiment, electrically conductive spacers are in each case contained in the two product chambers, the spacers and the conductive plate, for example, directly adjoining one another. The current within the cell will then flow from the first conductive and perforated plate to the spacer of the cathode-side product chamber and to the cathode; from the anode to the spacer of the anode-side product chamber and to the second conductive plate.

In cases in which the product chambers are machined into the electrodes (by the one-sided profiling of the electrode), the two conductive plates are situated directly on the raised areas of the profiled electrodes.

When several individual cells of the described type (without the two end flanges) are arranged above one another or next to one another and are electrically connected behind one another, a (bipolar) cell stack is obtained; in the following also called stack. In this case, the first conductive plate of an individual cell is electrically connected with the second plate of the preceding cell.

The described constructions are particularly suitable for smaller cell cross-sections (<200 $cm^2$). In the case of larger cell cross-sections, advantageously, the measures described in the following can be taken.

In an advantageous embodiment, the electric connection between the first conductive plate and the connection elements in the end flanges (in the case of an individual cell) and of the second conductive plate of the preceding cell (in the case of a stack) are constructed as follows.

The first plate is connected essentially along its whole circumference with a conductive contact element. In the case of a round cross-section of the cell and the plate, this conductive contact element has the shape of a ring (contact ring). This contact ring is pressed against the current connection elements on the corresponding end flange (in the case of the individual cell) or in the case of a stack, against the second conductive plate of the preceding cell. In an advantageous embodiment, this takes place by means of an O-ring which is situated in the groove of the contact ring.

This construction is particularly suitable for cell cross-sections of up to approximately 500 cm². It has the advantage that a radial current distribution along the whole circumference is achieved within the first plate at the transition into the second conductive plate of the adjoining cell.

Since, in the case of a stack, the second conductive plate of an individual cell is situated precisely at the transition between two cells, it will also be called a separating plate in the following.

For still larger cross-sections, the following construction is particularly suitable which can be used in the individual cell as well as in a stack. The membrane is provided with conductive breakthrough devices which are distributed along the whole membrane surface, for example, in a geometrical pattern. The above-mentioned first conductive plate can then be eliminated.

By means of this arrangement, an extremely homogeneous current conduction is achieved along the whole cross-section of the cell or of the electrodes.

The following applies to all of the above-mentioned embodiments. The cross-sectional shape of the cells and the corresponding shape of the essential elements is arbitrary, but preferably round or rectangular.

Other objects, advantages and novel features of the present invention will become apparent from the following detailed description of the invention when considered in conjunction with the accompanying drawings.

DETAILED DESCRIPTION OF THE DRAWINGS

Figure 1:
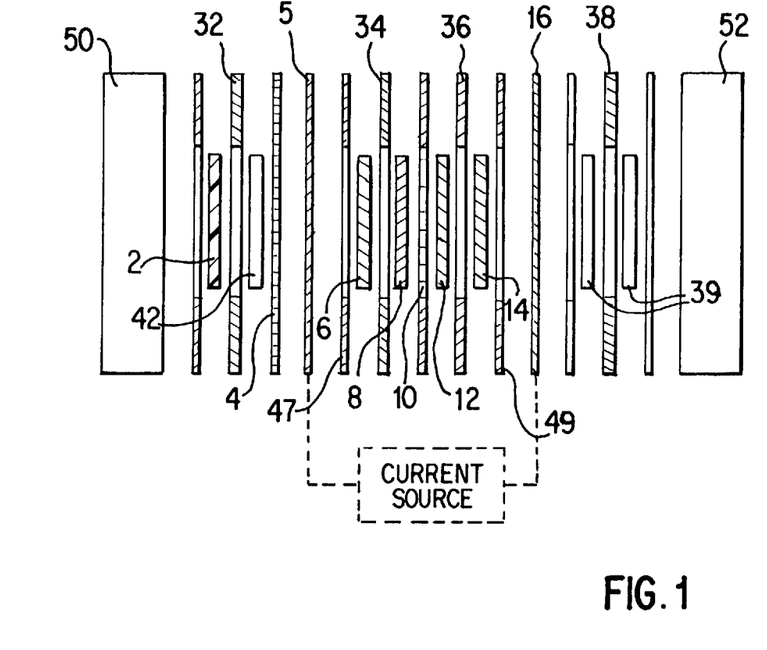
FIG. 1 is an exploded view of a first embodiment of the device according to the invention.

FIG. 1 illustrates a first embodiment of the arrangement according to the invention (exploded view). It is an electrolyzer consisting of an individual cell. On the left and on the right, the cell is bordered by two flanges 50, 52. The elements situated in-between are pressed together by means of tension rods (not shown here). From left to right, the elements which are important for the basic method of operation are shown (among others): Spacer 2 in the educt chamber (consisting of a plastic material), membrane 4, and membrane supporting layer 42 (in order to protect the membrane 4 from mechanical damage, for example, nonwovens, perforated disks, calendered fabric), first conductive plate 5 (perforated), spacer 6 (conductive) of the cathode-side product chamber, cathode 8, diaphragm 10, anode 12, spacer 14 (conductive) of the anode-side product chamber, and second conductive plate 16.

Additional seals 47, 49 are provided between individual elements. In the embodiment illustrated here, in addition, a fluid chamber ($H_2O$) with spacers 39, which are arranged in a common frame 38, exists for cooling purposes between the second plate 16 and the end flange 52. The current feeding into the cell takes place, for example, in that a current source is connected with the two plates 5 and 16. As an alternative, current connection elements may be contained in the end flanges 50, 52 and are connected, for example by way of electric lines, with the first conductive plate 5 or the second conductive plate 16. The lines extend outside the cell.

Advantageously, the individual spacers 2, 6, 14 are each arranged in separate frames 32, 34, 36. In the case of a cell with a round cross-section, ring-shaped frames are obtained. In the frame 36 for the spacer 14 of the anode-side product chamber, the anode 12 is also arranged. In the frame 34 for the spacer 6 of the cathode-side product chamber, the cathode 8 is also arranged.

In another embodiment not shown here, the following elements can be arranged in a common frame: the spacer 6 of the cathode-side product chamber, the cathode 8, the diaphragm 10, the spacer 14 of the anode-side product chamber, and the anode.

Figure 2:
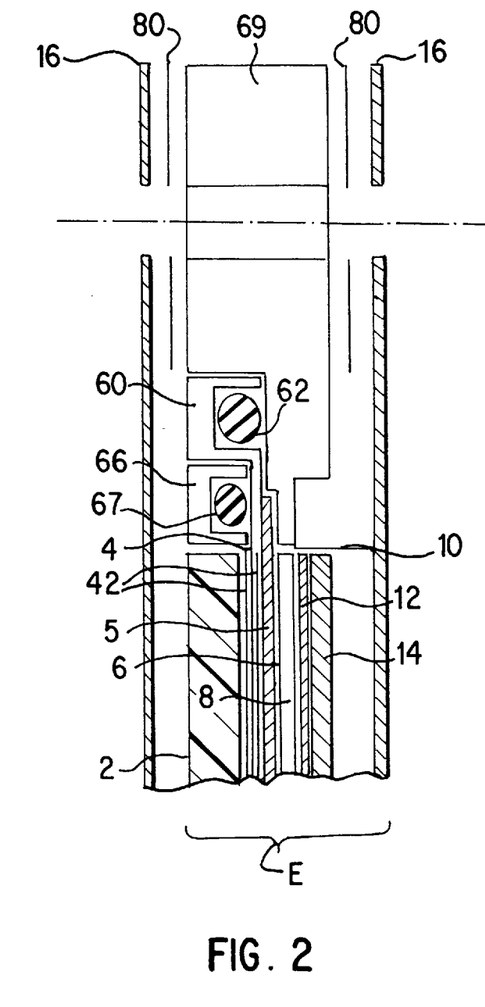
FIGS. 2 and 3 are views of a second embodiment of the device according to the invention.

FIG. 2 shows an individual cell E within a stack (partially exploded). The sequence of the individual elements (spacer 2 in the educt chamber, membrane 4 and membrane supporting layers 42 on both sides of the membrane 4, first conductive plate 5, spacer 6 of the cathode-side product chamber, diaphragm 10, anode 12, spacer 14 of the anode-side product chamber, second conductive plate 16) corresponds to the sequence of an individual cell illustrated in FIG. 1, but without the end flanges 50, 52. Because of the arrangement of several individual cells, the second conductive plate 16 of each individual cell now comes to be situated precisely at the transition between two individual cells. In the following, it will therefore also be called a separating plate.

The plate 16 which is on the left in FIG. 2 is therefore the second conductive plate of the adjacent individual cell which is not shown here. The plate 16 shown on the right is the second conductive plate of the cell illustrated here.

The cell and the elements forming it have a circular cross-section in this embodiment. The first plate 5 is essentially connected along its whole circumference with a contact element 60, in this case constructed as a contact ring. This contact ring 60, in turn, is pressed onto the separating plate 16 by means of an O-ring 62 which is situated in the groove of the contact ring 60. The pressing force of the O-ring 62 provides a continuous contact pressure of the contact ring 60 onto the separating plate 16 and therefore, on the whole, a good electric contact between the separating plate 16 and the perforated plate 5.

In a step of the contact ring 60, the membrane 4 is inserted on the water side and is sealed-off by means of a membrane frame 66, in this case, a membrane ring which, in turn, contains an O-ring 67. As an alternative, the sealing-off of the membrane 4 can take place by way of a flat packing arranged on both sides of the membrane.

The bridging of the membrane 4 by the arrangement of a contact ring 60 used here inside a stack can naturally also be used in an individual cell. In this case, the contact ring is pressed by means of the O-ring onto the current connection elements within the end flange.

In the illustrated embodiment, the elements of the individual cell are arranged in a common frame 69.

Figure 3:
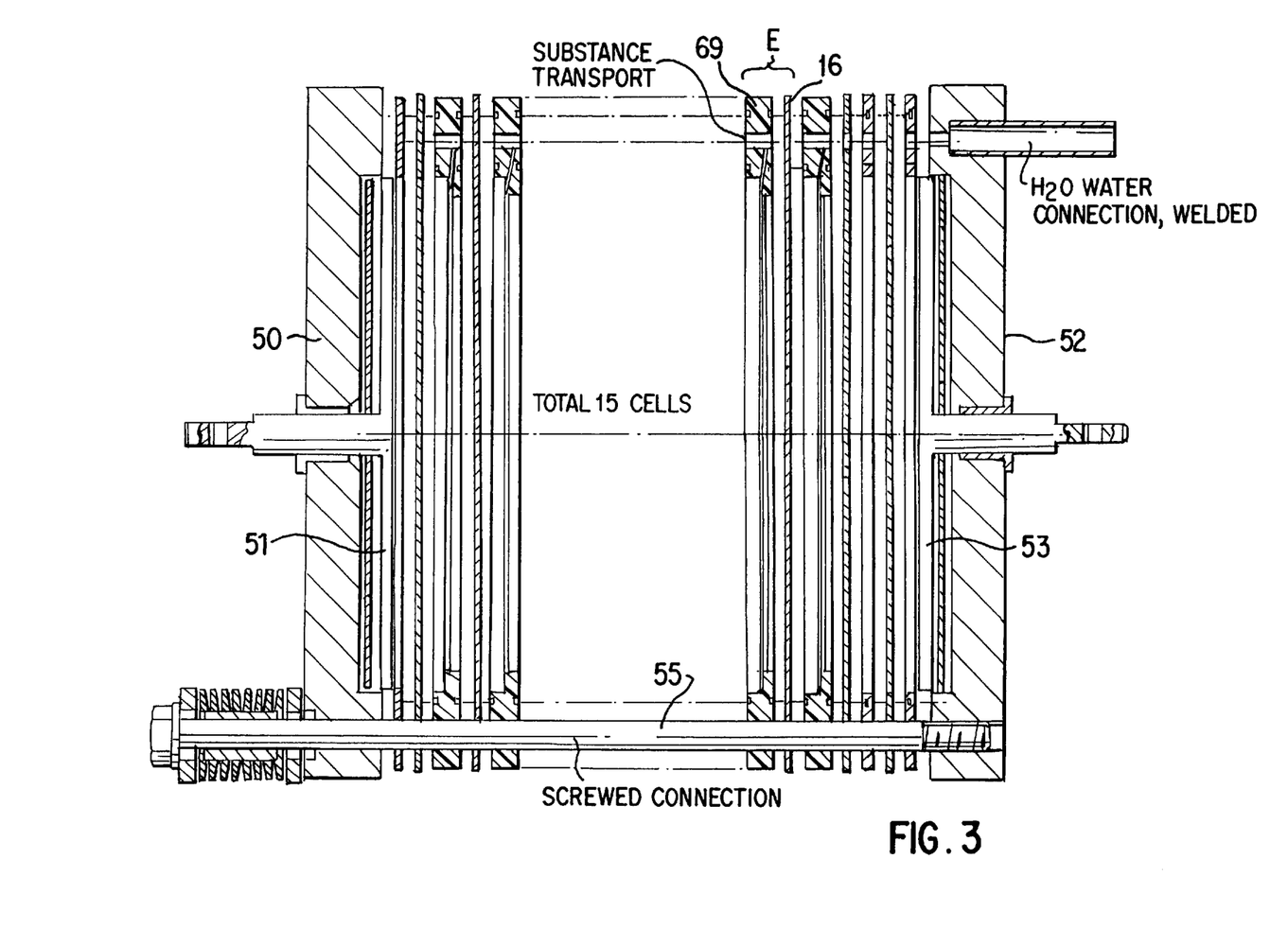

FIG. 3 shows a stack consisting of several individual cells E according to FIG. 2 (partially exploded). The individual cells are pressed into two flanges 50, 52, by which the current supply takes place through the use of current connection plates 51, 53. The individual cells E are bounded by the separating plates 16.

The educt supply and educt discharge, starting from one or several collecting fluid feed lines, takes place in parallel to the individual cells. The discharge of the product gases also takes place in parallel to the individual cells either by means of one or several collecting lines.

The supply and discharge lines of the educt and of the product gases are advantageously integrated in the frame of the electrolyzer, this overall frame being created by the pressing-together of the individual frames 69. The tension rods 55 are used for this purpose.

The frames 69 can be manufactured, for example, of KOH-resistant plastic materials and can be sealed off with respect to the adjoining components by means of flat packings 80 (FIG. 2) or shaped seals.

Figure 4:
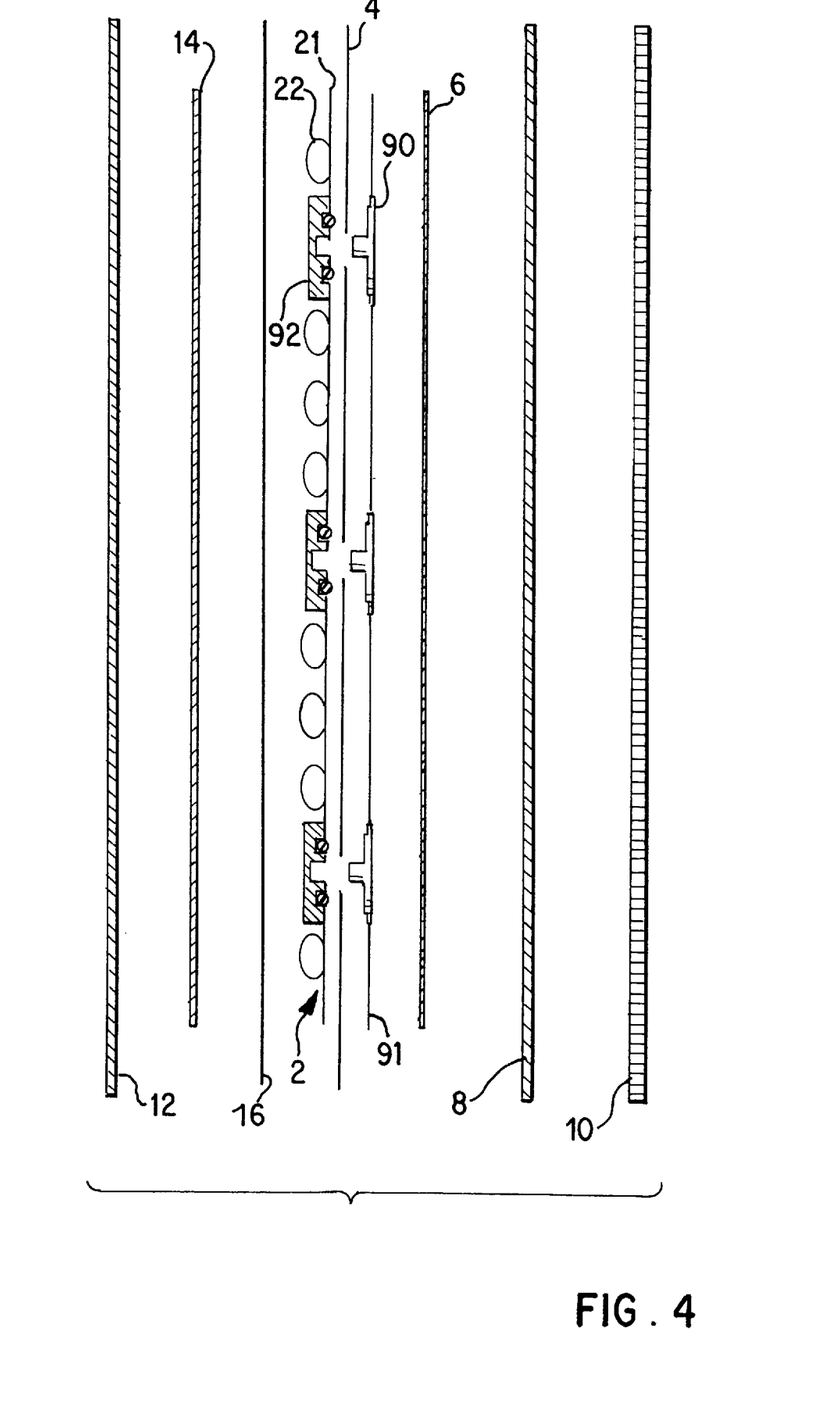
FIG. 4 is an exploded view of a third embodiment of the device according to the invention.

FIG. 4 illustrates another advantageous embodiment of the electrolyzer according to the invention which is constructed here as a stack (exploded view). The left area shows the anode 12, the spacer 14 of the anode-side product chamber as well as the second conductive plate 16 (separating plate) of an individual cell. These are followed by the elements of the adjoining cell: the spacer 2 (here constructed as a perforated plate 21 with spring elements), the educt chamber, the membrane 4, the cathode-side spacer 6, the cathode 8, the electrolyte matrix 10. At several points, the membrane 4 has breakthrough devices made of a conductive material. The breakthrough devices are preferably distributed uniformly along the whole membrane surface. In the illustrated embodiment, the breakthrough devices are formed by a pin 90 as well as a bush 92 as the counterpart.

For improving the handling, the pins 90 can be arranged on a perforated plate 91 so that the perforated plate 91 together with the pins 90 can be placed as a whole on the membrane 4. By means of the perforated plate 91, the pins are electrically connected with one another, which further improves the homogeneity of the current distribution. In the assembled condition, the top side of the pin head rests in each case against the conductive cathode-side spacer 6. In this embodiment, the bushes 92 are arranged on the perforated plate 21 of the spacer 2 of the educt chamber.

By means of this arrangement, a conductive connection is achieved between the cathode-side spacer 6 and the conductive plate 16 of the adjoining cell. The poorly conducting membrane 4 is thus bridged. A homogeneous current distribution is obtained along the whole cross-sectional surface of the membrane 4. In contrast to the preceding examples, a first conductive plate (reference number 5 in FIGS. 1, 2) between the cathode-side spacer 6 and the membrane 4 is not required.

Figure 5:
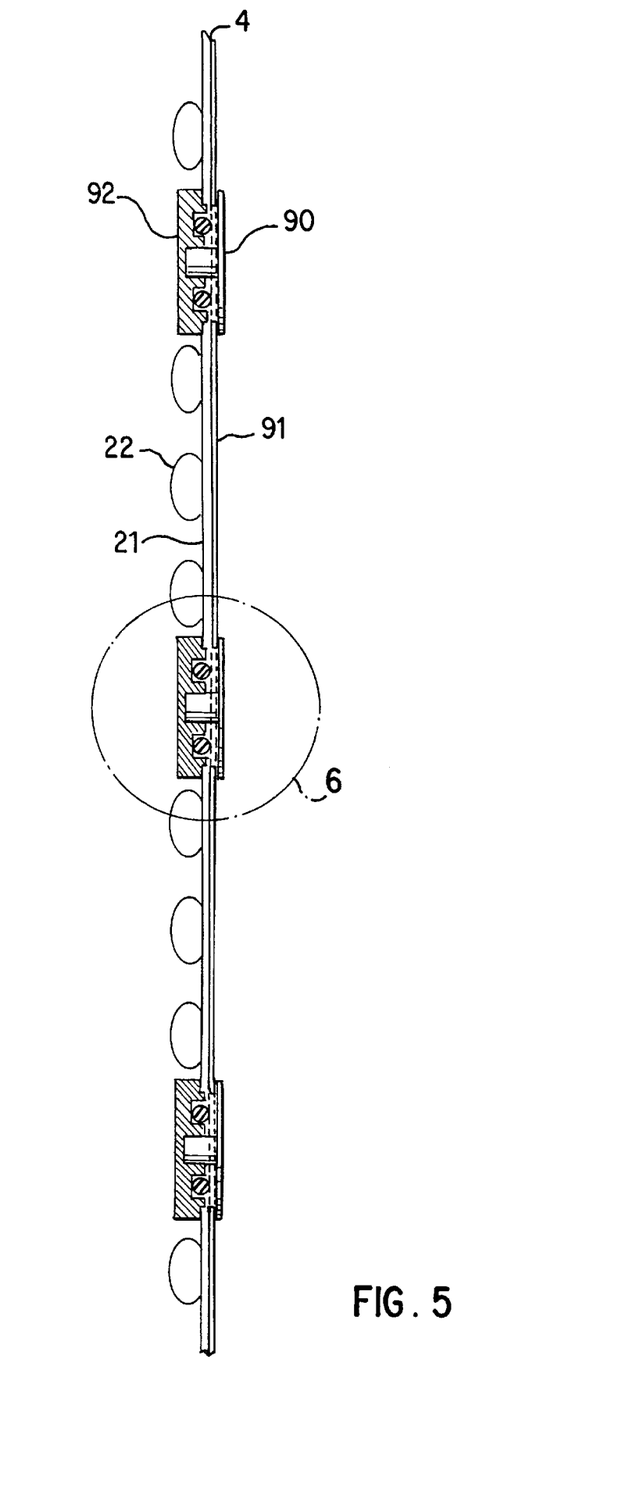
FIG. 5 is an enlarged view of a portion of FIG. 4.

FIG. 5 is a detailed partially exploded representation of the construction in the direct vicinity of the membrane 4 from FIG. 4. The spacer of the educt chamber comprises the perforated plate 21 and spring elements 22. The membrane 4 is arranged between the perforated plate 21 of the spacer and the additional perforated plate 91 in which the pins 90 are arranged. The membrane 4 is penetrated by the pins 90. On the other side of the membrane 4, these are welded to bushes 92. The bushes themselves are arranged on the perforated plate 21. Naturally, with respect to their arrangement on the two membrane sides, the pins 90 and the bushes 92 can also be exchanged.

Figure 6:
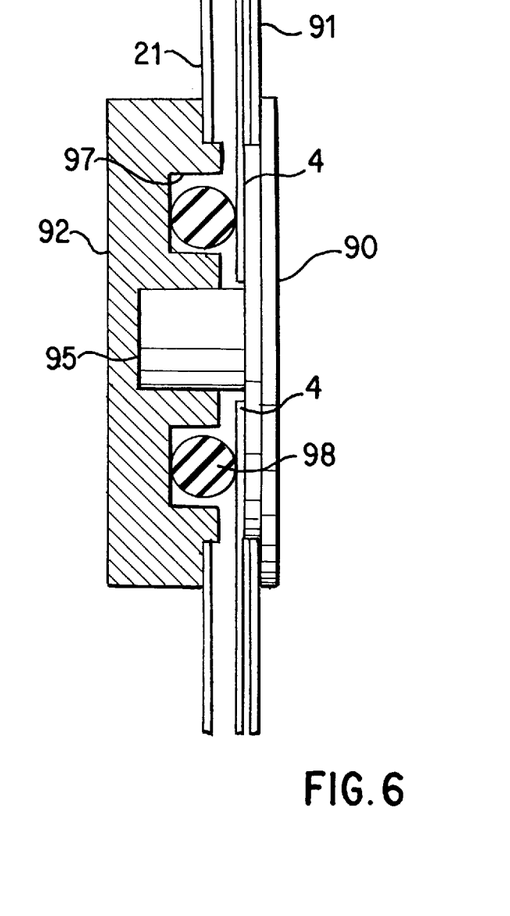
FIG. 6 is an enlarged view of portion A in FIG. 5.

FIG. 6 shows the detail A from FIG. 5. On the face 95 of the pin shaft, the pin 90 is connected with the bush 92 by means of point welding. An O-ring 98 for the sealing is arranged in a groove 97 of the bush 92.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. An electrolyzer comprising:

an educt chamber;

a cathode-side product chamber arranged adjacent said educt chamber;

a membrane arranged between said educt chamber and the cathode side product chamber;

a first electrically conductive plate arranged between the membrane and the cathode-side product chamber;

a porous cathode having pores in which a liquid electrolyte is adapted for being fixed;

a diaphragm arranged adjacent the porous cathode;

a porous anode having pores arranged on an opposite side of said diaphragm from said porous cathode, the liquid electrolyte also being adaptable for fixing in the pores of the porous anode;

an anode-side product chamber adjacent the porous anode; and a second electrically conductive plate arranged adjacent to the anode-side product chamber;

wherein via the first and second electrically conductive plates, a current supply to and a current removal from the porous anode and porous cathode occurs.

2. The electrolyzer according to claim 1, wherein said first and said second conductive plates are directly connected with a current source.

3. The electrolyzer according to claim 1, further comprising end flanges which border said electrolyzer.

4. An electrolyzer having an educt chamber, a membrane, a cathode-side product chamber, a porous cathode adaptable for fixing a liquid electrolyte in pores of said porous cathode, a diaphragm, a porous anode adaptable for fixing the liquid electrolyte in pores of said porous anode, and an anode-side product chamber, wherein between said membrane and said cathode-side product chamber, a first electrically conductive plate and, adjacent to said anode-side product chamber, a second electrically conductive plate, are arranged, wherein via said first and second electrically conductive plates, a current supply to and a current removal from said porous anode and porous cathode occurs; and wherein said end flanges contain current connection elements electrically connected with said first and second conductive plates.

5. An electrolyzer having an educt chamber, a membrane, a cathode-side product chamber, a porous cathode adaptable for fixing a liquid electrolyte in pores of said porous cathode, a diaphragm, a porous anode adaptable for fixing the liquid electrolyte in pores of said porous anode, and an anode-side product chamber, wherein between said membrane and said cathode-side product chamber, a first electrically conductive plate and, adjacent to said anode-side product chamber, a second electrically conductive plate, are arranged, wherein via said first and second electrically conductive plates, a current supply to and a current removal from said porous anode and porous cathode occurs; and further comprising electrically conductive spacers situated in at least one of said educt chamber and said cathode-side and anode-side product chambers.

6. The electrolyzer according to claim 5, wherein said electrically conductive spacers are each arranged in separate frames.

7. The electrolyzer according to claim 6, wherein said porous cathode is arranged in one of said frames in which a first of said spacers for the cathode-side product chamber is arranged.

8. The electrolyzer according to claim 7, wherein said porous anode is arranged in another of said frames in which another of said spacers for said anode-side product chamber is arranged.

9. The electrolyzer according to claim 6, wherein said porous anode is arranged in one of said frames, in which a first of said spacers for said anode-side product chamber is arranged.

10. The electrolyzer according to claim 6, further comprising tension rods arranged within said separate frames.

11. An electrolyzer having an educt chamber, a membrane, a cathode-side product chamber, a porous cathode adaptable for fixing a liquid electrolyte in pores of said porous cathode, a diaphragm, a porous anode adaptable for fixing the liquid electrolyte in pores of said porous anode, and an anode-side product chamber, wherein between said membrane and said cathode-side product chamber, a first electrically conductive plate and, adjacent to said anode-side product chamber, a second electrically conductive plate, are arranged, wherein via said first and second electrically conductive plates, a current supply to and a current removal from said porous anode and porous cathode occurs; and
wherein a common frame contains a spacer for said cathode-side product chamber, the porous cathode, the diaphragm, a spacer for said anode-side product chamber, and the porous anode.

12. An electrolyzer having an educt chamber, a membrane, a cathode-side product chamber, a porous cathode adaptable for fixing a liquid electrolyte in pores of said porous cathode, a diaphragm, a porous anode adaptable for fixing the liquid electrolyte in pores of said porous anode, and an anode-side product chamber, wherein adjacent to said anode-side product chamber, a first electrically conductive plate is arranged, and wherein said membrane is penetrated by electrically conductive elements, such that a current supply to and a current removal from said porous anode and porous cathode takes place by way of said electrically conductive elements and said first conductive plate.

13. The electrolyzer according to claim 12, wherein said electrically conductive elements are electrically conductive breakthrough devices distributed over a surface of said membrane.

14. The electrolyzer according to claim 13, wherein said breakthrough devices are distributed in a regularly spaced manner over said surface.

15. The electrolyzer according to claim 13, wherein said electrically conductive elements are breakthrough devices comprising a pin arranged on one side of said membrane and a bush on another side of said membrane, said pin and bush being connected with one another.

16. The electrolyzer according to claim 15, wherein said pin and bush are welded to one another.

17. The electrolyzer according to claim 15, wherein an O-ring seal is integrated in said bush for sealing.

18. The electrolyzer according to claim 15, wherein at least one of said pins and bushes is arranged on a conductive wall.

19. The electrolyzer according to claim 12, wherein said electrically conductive elements are breakthrough devices comprising a pin arranged on one side of said membrane and a bush on another side of said membrane, said pin and bush being connected with one another.

20. The electrolyzer according to claim 19, wherein said pin and bush are welded to one another.

21. The electrolyzer according to claim 19, wherein an O-ring seal is integrated in said bush for sealing.

22. The electrolyzer according to claim 19, wherein at least one of said pins and bushes is arranged on a conductive wall.

23. An electrolyzer, comprising:
several series-connected individual cells, wherein each of said individual cells comprises:
an educt chamber;
a cathode-side product chamber arranged adjacent said educt chamber;
a membrane arranged between said educt chamber and the cathode side product chamber;
a first electrically conductive plate arranged between the membrane and the cathode-side product chamber;
a porous cathode having pores in which a liquid electrolyte is adapted for being fixed;
a diaphragm arranged adjacent the porous cathode;
a porous anode having pores arranged on an opposite side of said diaphragm from said porous cathode, the liquid electrolyte also being adaptable for fixing in the pores of the porous anode;
an anode-side product chamber adjacent the porous anode; and
a second electrically conductive plate arranged adjacent to the anode-side product chamber;
wherein via the first and second electrically conductive plates, a current supply to and a current removal from the porous anode and porous cathode occurs, and wherein said first electrically conductive plate of one of said individual cells is in electrical contact with said second electrically conductive plate of an adjacent individual cell.

24. An electrolyzer, comprising:
several series-connected individual cells, wherein each of said individual cells includes an educt chamber, a membrane, a cathode-side product chamber, a porous cathode adaptable for fixing a liquid electrolyte in pores of said porous cathode, a diaphragm, a porous anode adaptable for fixing the liquid electrolyte in pores of said porous anode, and an anode-side product chamber, wherein between said membrane and said cathode-side product chamber, a first electrically conductive plate and, adjacent to said anode-side product chamber, a second electrically conductive plate, are arranged, wherein via said first and second electrically conductive plates, a current supply to and a current removal from said porous anode and porous cathode occurs, and wherein said first electrically conductive plate of one of said individual cells is in electrical contact with said second electrically conductive plate of an adjacent individual cell; and
wherein said first conductive plate is connected essentially along its entire circumference with a conductive contact element, said contact element being pressed onto said second conductive plate of said adjacent individual cell via a seal situated in a groove of said contact element.

25. The electrolyzer according to claim 24, wherein a membrane frame is arranged on a first step of said contact element, a sealing taking place via a further seal situated in a groove of said membrane frame.

26. An electrolyzer comprising:
several series-connected individual cells, wherein each of said individual cells includes an educt chamber, a membrane, a cathode-side product chamber, a porous cathode adaptable for fixing a liquid electrolyte in pores of said porous cathode, a diaphragm, a porous anode adaptable for fixing the liquid electrolyte in pores of said porous anode, and an anode-side product chamber, wherein adjacent to said anode-side product chamber, a first electrically conductive plate is arranged, and wherein said membrane is penetrated by electrically conductive elements, such that a current supply to and a current removal from said anode and cathode takes place by way of said electrically conductive elements and said first conductive plate.

27. The electrolyzer according to claim 26, wherein elements of each individual cell are arranged in a common frame.

28. The electrolyzer according to claim 27, wherein tension rods are arranged within said common frames.

29. An electrolyzer, comprising:

several series-connected individual cells, wherein each of said individual cells includes an educt chamber, a membrane, a cathode-side product chamber, a porous cathode adaptable for fixing a liquid electrolyte in pores of said porous cathode, a diaphragm, a porous anode adaptable for fixing the liquid electrolyte in pores of said porous anode, and an anode-side product chamber, wherein between said membrane and said cathode-side product chamber, a first electrically conductive plate and, adjacent to said anode-side product chamber, a second electrically conductive plate, are arranged, wherein via said first and second electrically conductive plates, a current supply to and a current removal from said porous anode and porous cathode occurs, and wherein said first electrically conductive plate of one of said individual cells is in electrical contact with said second electrically conductive plate of an adjacent individual cell; and wherein elements of each individual cell are arranged in a common frame.

30. The electrolyzer according to claim 29, wherein tension rods are arranged within said common frames.

* * * * *